United States Patent
Laur et al.

(10) Patent No.: US 10,525,903 B2
(45) Date of Patent: Jan. 7, 2020

(54) MOVING TRAFFIC-LIGHT DETECTION SYSTEM FOR AN AUTOMATED VEHICLE

(71) Applicant: Aptiv Technologies Limited, St. Michael (BB)

(72) Inventors: Michael H. Laur, Mission Viejo, CA (US); Brian R. Hilnbrand, Mountain View, CA (US); Ronald J. Szabo, Noblesville, IN (US)

(73) Assignee: Aptiv Technologies Limited (BB)

( * ) Notice: Subject to any disclaimer, the term of this patent is extended or adjusted under 35 U.S.C. 154(b) by 379 days.

(21) Appl. No.: 15/638,546

(22) Filed: Jun. 30, 2017

(65) Prior Publication Data
US 2019/0001900 A1    Jan. 3, 2019

(51) Int. Cl.
| B60R 11/04 | (2006.01) |
|---|---|
| G08G 1/07 | (2006.01) |
| G01S 13/86 | (2006.01) |
| G01S 13/91 | (2006.01) |
| G06K 9/00 | (2006.01) |
| G01S 13/00 | (2006.01) |

(52) U.S. Cl.
CPC ............ *B60R 11/04* (2013.01); *G01S 13/867* (2013.01); *G01S 13/91* (2013.01); *G06K 9/00825* (2013.01); *G08G 1/07* (2013.01)

(58) Field of Classification Search
CPC ...................... G06K 9/00825; G08G 1/096725
See application file for complete search history.

(56) References Cited

U.S. PATENT DOCUMENTS

| 7,398,076 | B2 * | 7/2008 | Kubota | ............ G08G 1/096725 455/344 |
|---|---|---|---|---|
| 8,761,991 | B1 | 6/2014 | Ferguson et al. | |
| 8,831,849 | B2 * | 9/2014 | Joshi | ...................... B60R 11/04 701/70 |
| 9,145,140 | B2 * | 9/2015 | Ferguson | ............ G06K 9/00825 |
| 9,248,832 | B2 * | 2/2016 | Huberman | ......... G06K 9/00825 |
| 9,779,314 | B1 * | 10/2017 | Wendel | .............. G06K 9/00825 |
| 9,892,332 | B1 * | 2/2018 | Wendel | .............. G06K 9/00825 |
| 9,990,548 | B2 * | 6/2018 | Wellington | ......... G06K 9/00825 |
| 10,108,868 | B1 * | 10/2018 | Wendel | .............. G06K 9/00825 |
| 10,346,696 | B1 * | 7/2019 | Wendel | .............. G06K 9/00825 |

(Continued)

FOREIGN PATENT DOCUMENTS

WO     2013/147994 A1    10/2013

*Primary Examiner* — Bernarr E Gregory
(74) *Attorney, Agent, or Firm* — Joseph V. Bonadies

(57) ABSTRACT

A traffic-light-detection system that visually determines a light-state of a traffic-light proximate to an automated vehicle includes a camera, a controller, and optionally a radar. The camera and the radar are on a host-vehicle. The camera renders a series-of-images of a traffic-light proximate to a host-vehicle. The radar detects radar-returns from the traffic-light. The controller is configured to determine a motion-pattern of the traffic-light based on the series-of-images and/or the radar-returns, and select a preferred-image from the series-of-images based on the motion-pattern. The preferred-image shows a light-source of the traffic-light characterized as being most directed at the camera when the motion-pattern indicates that the traffic-light is moving. The controller is further configured to determine a light-state of the traffic-light based on the preferred-image.

13 Claims, 3 Drawing Sheets

(56) References Cited

U.S. PATENT DOCUMENTS

2010/0033571 A1  2/2010  Fujita et al.
2012/0288138 A1  11/2012  Zeng
2015/0210277 A1  7/2015  Ben Shalom

* cited by examiner

MOVING TRAFFIC-LIGHT DETECTION SYSTEM FOR AN AUTOMATED VEHICLE

TECHNICAL FIELD OF INVENTION

This disclosure generally relates to a traffic-light-detection system, and more particularly relates to a system that determines a motion-pattern of the traffic-light, and then selects a preferred-image from a series-of-images provided by a camera based on the motion-pattern, where the preferred-image is an image that shows a light-source of the traffic-light characterized as being most directed at the camera.

BACKGROUND OF INVENTION

It has been observed that camera based vision systems used on automated vehicles often have difficulty detecting the state of a traffic-signal (e.g. red, yellow, green) when the traffic-signal is moving due to, for example, wind.

SUMMARY OF THE INVENTION

In accordance with one embodiment, a traffic-light-detection system that visually determines a light-state of a traffic-light proximate to an automated vehicle is provided. The system includes a camera and a controller. The camera is on a host-vehicle. The camera renders a series-of-images of a traffic-light proximate to a host-vehicle. The controller is in communication with the camera. The controller is configured to determine a motion-pattern of the traffic-light based on the series-of-images, and then select a preferred-image from the series-of-images. The preferred-image shows a light-source of the traffic-light characterized as being most directed at the camera when the motion-pattern indicates that the traffic-light is moving. The controller is further configured to determine a light-state of the traffic-light based on the preferred-image.

In another embodiment, a traffic-light-detection system that visually determines a light-state of a traffic-light proximate to an automated vehicle is provided. The system includes a camera, a radar, and a controller. The camera and the radar are on a host-vehicle. The camera renders a series-of-images of a traffic-light proximate to a host-vehicle. The radar detects radar-returns from the traffic-light. The controller is in communication with the camera and the radar. The controller is configured to determine a motion-pattern of the traffic-light based on the radar-returns, and select a preferred-image from the series-of-images based on the motion-pattern. The preferred-image shows a light-source of the traffic-light characterized as being most directed at the camera when the motion-pattern indicates that the traffic-light is moving. The controller is further configured to determine a light-state of the traffic-light based on the preferred-image.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
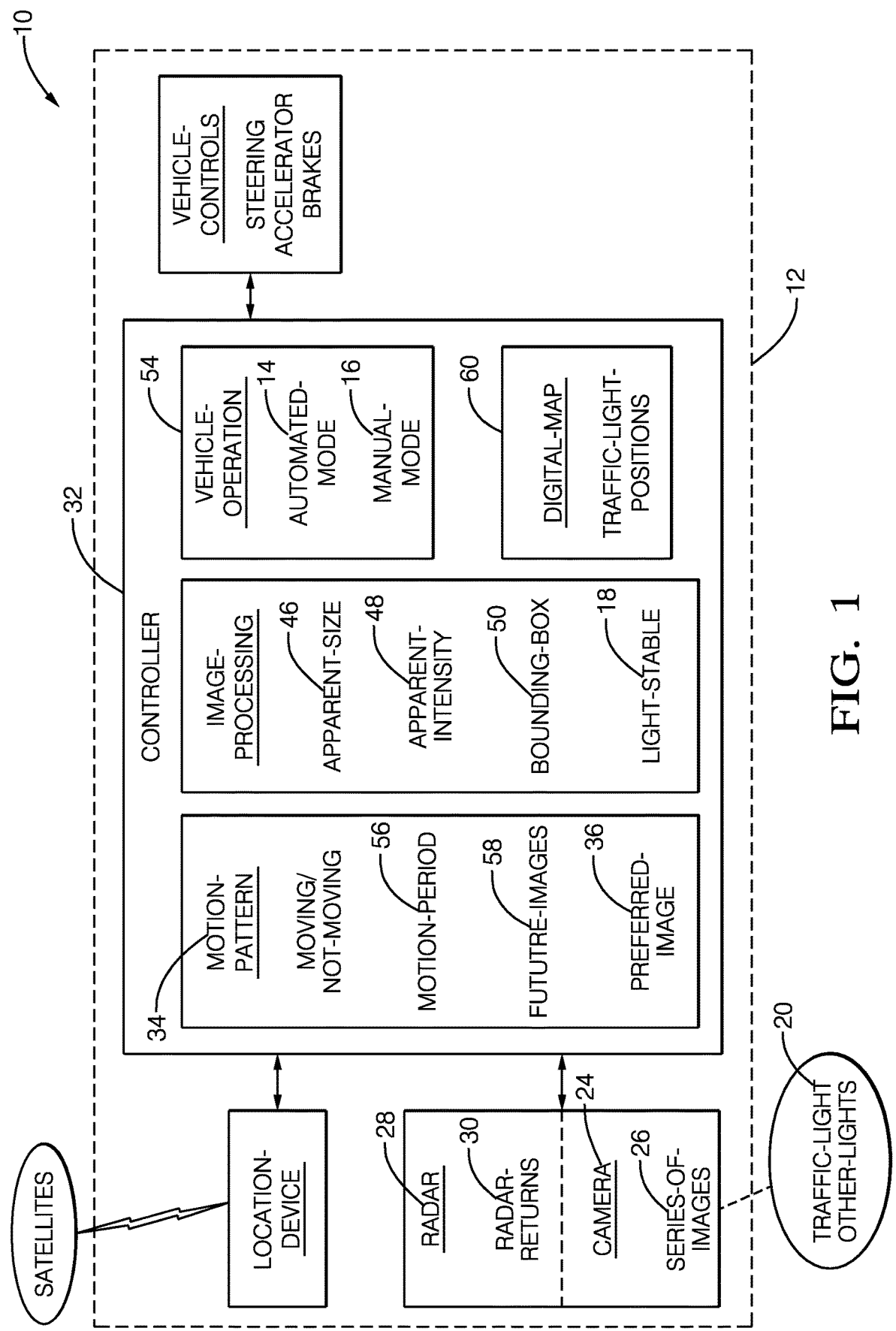
FIG. 1 is a diagram of a traffic-light-detection system in accordance with one embodiment.

FIG. 1 illustrates a non-limiting example of a traffic-light-detection system 10, hereafter referred to as the system 10. In general, the system 10 visually determines a light-state 18 (e.g. red, green yellow) of a traffic-light 20 proximate to, e.g. in front of, within fifty meters (50m) for example, an automated vehicle, e.g. a host-vehicle 12. Advantageously, the system 10 is able to determine the light-state 18 when the traffic-light 20 is moving, e.g. swinging from a cable 40 (FIG. 2) that spans an intersection 22. When the traffic-light 20 is moving, the light emitted by the traffic-light 20 appears to vary from the perspective of the host-vehicle 12 as the direction of the bore-site of light emitted by the traffic-light 20 varies. The apparent variation in apparent-intensity and/or size of the illuminated light (e.g. red, green yellow) on the traffic-light 20 may make it difficult for prior examples of visual traffic light detection systems to determine the light-state 18 of the traffic-light.

As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely warn the human-operator as needed to, for example, avoid 'running' a red-light, i.e. traveling through an intersection 22 (FIG. 2) when the traffic-light 20 indicates that the host-vehicle 12 should stop.

The system 10 includes a camera 24 on a host-vehicle 12. The camera 24 may be a video-camera or a camera capable of taking periodically timed images. Whatever type is used, the camera 24 needs to be capable to render a series-of-images 26 of the traffic-light 20. Those in the art will recognize that there are a wide variety of commercially available cameras that are suitable for this application. If the camera 24 is used to determine a motion-pattern 34 of the traffic-light 20 if/when the traffic-light 20 is moving, it is preferable that the camera 24 has or is characterized by a minimum frame-rate, ten frames-per-second (10 fps) for example. As used herein, the motion-pattern 34 may be a characterization of the type of motion exhibited by the traffic-light 20. For example, the motion-pattern 34 may be characterized as swinging forward-and-backward relative to the host-vehicle 12, side-to-side (i.e. sideways or left-and-right) relative to the host-vehicle 12, swinging diagonally relative to the host-vehicle 12, oscillatory-rotating about a vertical-axis of the traffic-light 20, oscillating vertically along the vertical-axis (bouncing), or any combination thereof. The details of how the motion-pattern 34 is determined and how the series-of-images 26 are analyzed will be explained in more detail later.

The system 10 optionally includes a radar 28 on the host-vehicle 12. A variety of radar-devices are commercially available for automotive applications that would be suitable to emit a radar-signal toward the traffic-light 20 and detect instances of radar-returns 30 reflected by, and/or returning from, the traffic-light 20. If the radar 28 is used to determine a motion-pattern 34 of the traffic-light 20 when the traffic-light 20 is moving, it is preferable that the radar 28 has or is characterized by a minimum frame-rate, ten frames-per-second (10 fps) for example.

The system 10 includes a controller 32 in communication with the camera 24, and the radar 28 if the radar 28 is provided or included in the configuration of the system 10. The controller 32 may include a processor (not specifically shown) such as a microprocessor or other control circuitry such as analog and/or digital control circuitry including an application specific integrated circuit (ASIC) for processing data as should be evident to those in the art. The controller 32 may include memory (not specifically shown), including non-volatile memory, such as electrically erasable programmable read-only memory (EEPROM) for storing one or more routines, thresholds, and captured data. The one or more routines may be executed by the processor to perform steps for determining the motion-pattern 34 and the light-state 18 based on signals received by the controller 32 from the camera 24 and optionally the radar 28 as described herein.

If the system 10 does not include the radar 28, then the controller 32 may be configured to determine a motion-pattern 34 of the traffic-light 20 based on the series-of-images 26, and then select a preferred-image 36 from the series-of-images 26. If the traffic-light is not moving, then likely any or all of the images in the series-of-images 26 could be analyzed to determine the light-state 18. Indeed, it is recognized that basing the determination of the light-state 18 on multiple images increases the confidence-level of the determination of the light-state 18. However, when the traffic-light 20 is moving, the position of the illuminated light (red, green, yellow) in each image of the series-of-images 26 likely changes which can make it difficult to have a high confidence-level.

As used herein, the preferred-image 36 from the series-of-images 26 may be characterized one or more of the images that shows, or was rendered when, a light-source 38 (FIGS. 3A and 3B) of the traffic-light 20 is characterized as being most directed at the camera 24 when/while the motion-pattern 34 indicates that the traffic-light 20 is moving. That is, the preferred-image 36 is selected from the series-of-images 26 as being the one or more images that is/are most likely to indicate the light-state 18 with high-confidence. It is recognized that if the motion-pattern 34 is relatively periodic, i.e. relatively predictable, then there may be multiple instances of the preferred-image 36 present in the series-of-images 26 that are temporally spaced apart in accordance with the periodicity of motion or oscillation of the traffic-light 20.

Figure 2:
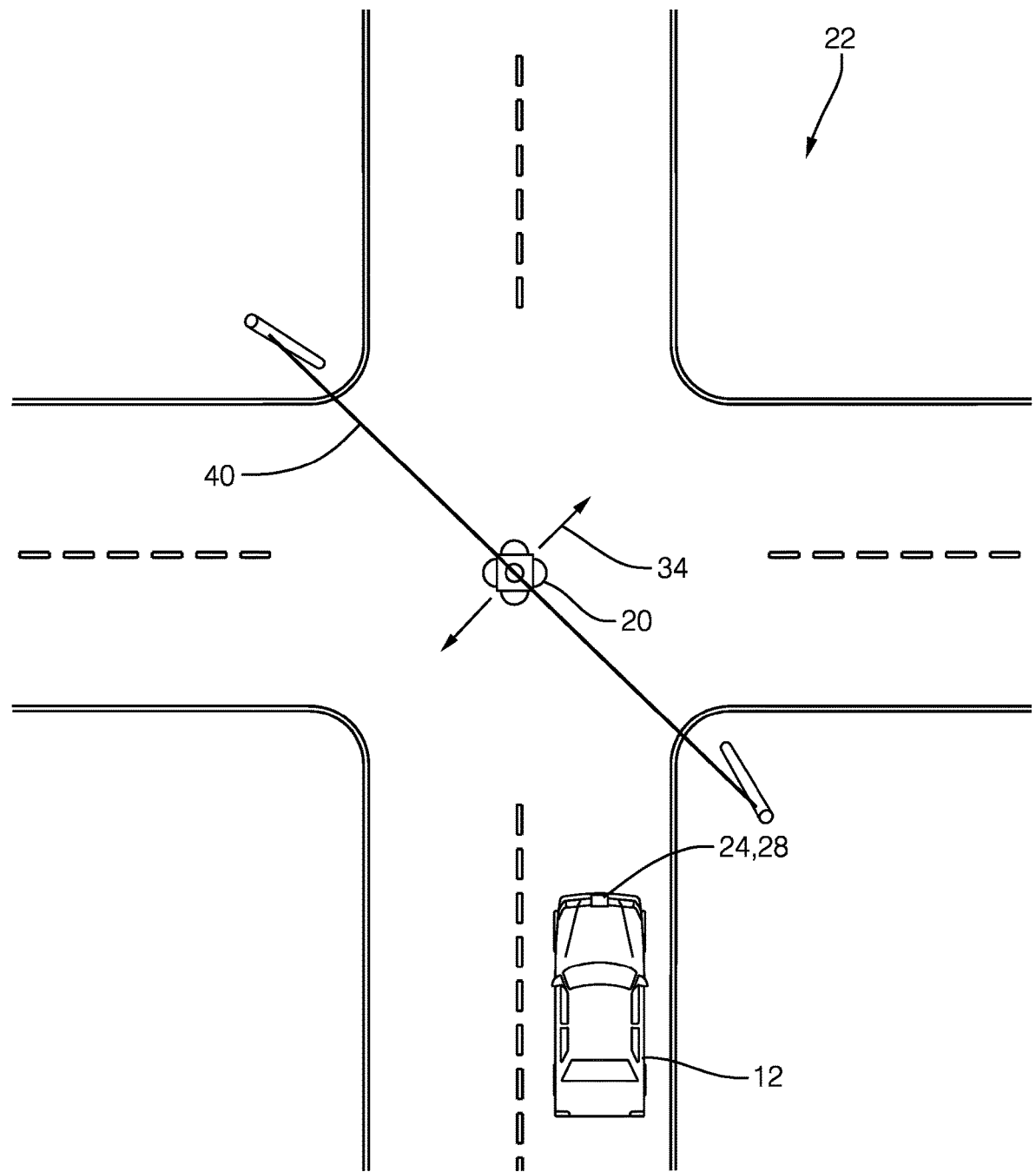
FIG. 2 is a top view of an intersection encountered by the system of FIG. 1 in accordance with one embodiment.

FIG. 2 illustrates a non-limiting example of an intersection 22 equipped with a traffic-light 20 that is suspended above the intersection 22 by a cable 40 that is attached to poles at each end of the cable 40. In this non-limiting example the traffic-light 20 is moving or swinging with a motion-pattern 34 that can be characterized as swinging diagonally relative to a view-perspective of the host-vehicle 12.

Figure 3A:
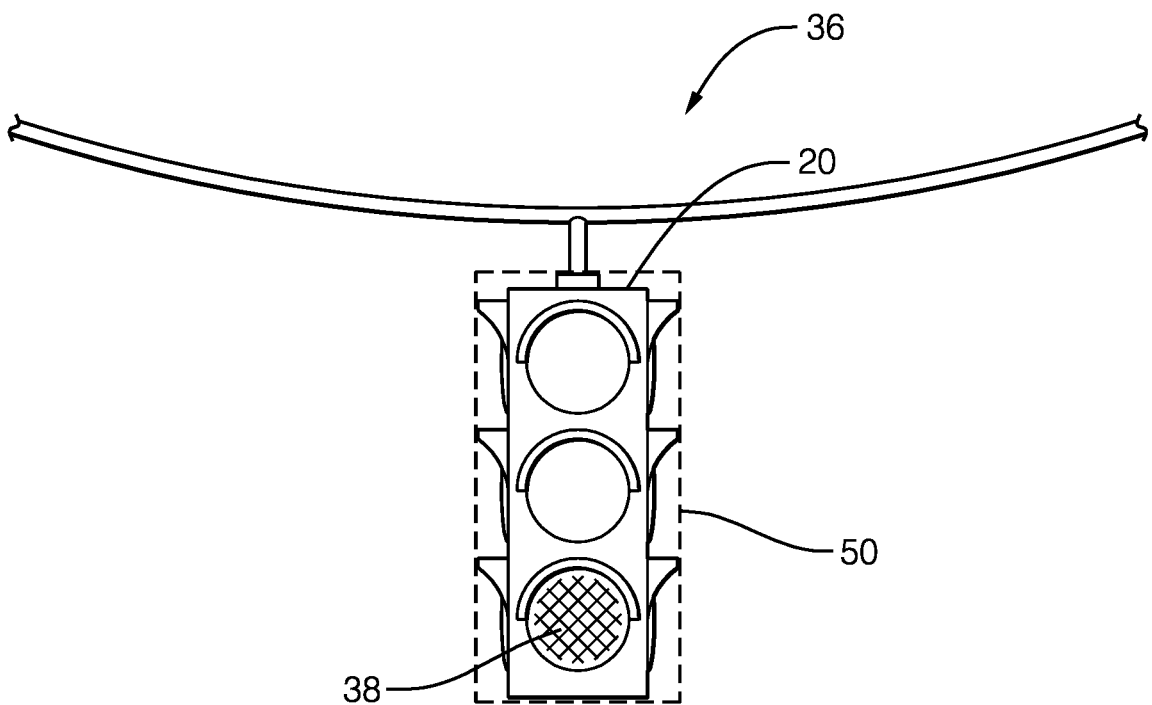
FIGS. 3A and 3B are images from a series-of-images rendered by the system of FIG. 1 in accordance with one embodiment.
Figure 3B:
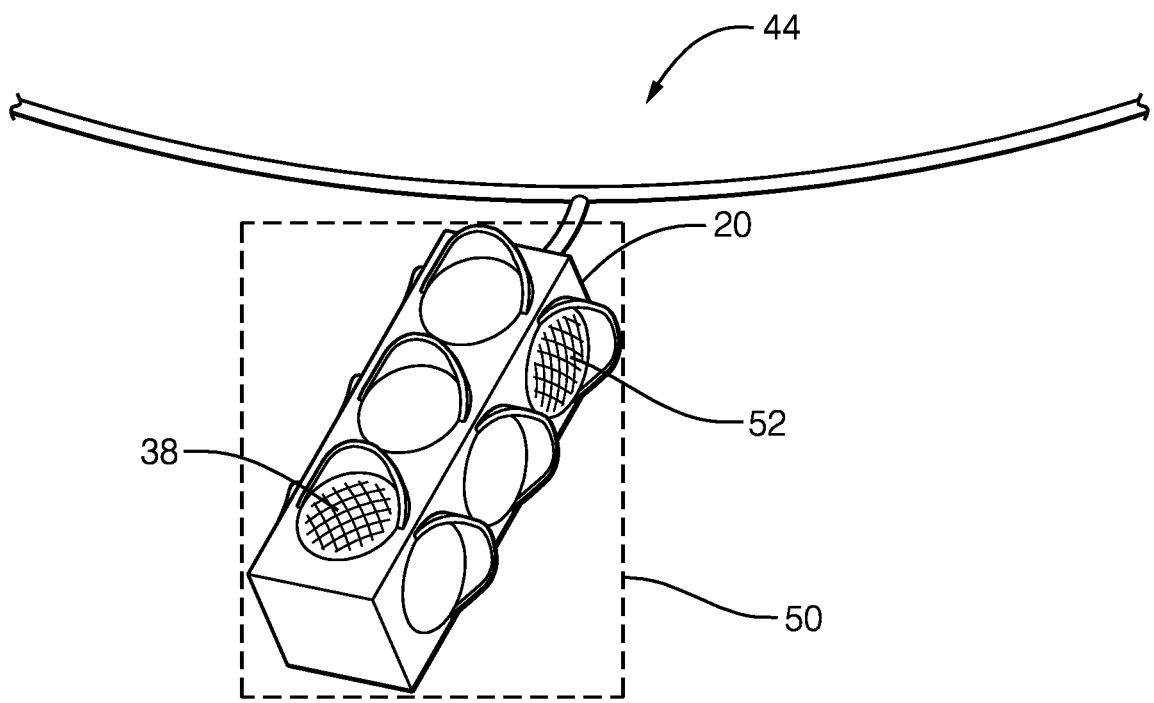

FIGS. 3A and 3B are non-limiting examples of images from the series-of-images 26 that may have been taken by the camera 24 from the perspective illustrated in FIG. 2 while the traffic-light was moving in accordance with the motion-pattern 34 illustrated in FIG. 2. FIG. 3A may be characterized as an instance of the preferred-image 36 because the light-source 38, the green light in this example, is well-directed toward the camera 24, i.e. is pointed almost directly at the camera 24. By contrast, FIG. 3B may be characterized as an instance of a discarded-image 44 from the series-of-images 26 because the light-source is not well-directed toward the camera 24, i.e. is pointed away from the camera 24. If the motion-pattern 34 is relatively periodic, then there may be multiple instances of the preferred-image 36 shown in FIG. 3A present in the series-of-images 26 that are temporally spaced apart and repeat or reoccur on a periodic basis. It follows that the multiple instances of the preferred-image 36 shown in FIG. 3A may be grouped together for image-processing to determine the light-state 18 based on multiple instances of the preferred-image 36 and thereby determine the light-state 18 with high-confidence.

As previously suggested, the system 10 may include the radar 28, so it follows that the controller 32 would be in communication with the camera 24 and the radar 28. In this radar-included embodiment of the system 10, the controller 32 may be configured to determine the motion-pattern 34 of the traffic-light 20 based on the radar-returns 30, and then select the preferred-image 36 from the series-of-images 26 based on the motion-pattern 34 indicated by the radar 28 rather than what might be indicated by the camera 24. Alternatively, it is contemplated that information from both the camera 24 and the radar 28 may be combined to determine which images of the series-of-images 26 is the preferred-image 36 or are the preferred-images. The radar-returns 30 may be analyzed using a variety of techniques known to those in the radar arts to determine the motion-pattern 34 of the traffic-light 20.

By way of example and not limitation, one technique may be to determine, based on the radar-returns 30, when a mid-point of a periodic motion occurs, and then designate the image from the series-of-images 26 that temporally coincides with the mid-point as the preferred-image 36. In view of the motion-pattern 34 suggested in FIG. 2, the image that corresponds to the mid-point is likely that shown in FIG. 3A, which corresponds to the position of the traffic-light shown in FIG. 2. That is, it is believed that the mid-point is where the light-source 38 of the traffic-light 20 characterized as being most directed at the camera 24. In contrast, an end-point of the motion-pattern 34, i.e. a point of maximum deflection away from the mid-point, may correspond to FIG. 3B. It is also contemplated that the series-of-images 26 would likely include one or more images that is/are the opposite of FIG. 3B. That is, if FIG. 3B is characterized as the traffic-light 20 swinging toward and leftward relative to the camera 24, then there is expected to be an opposite image in the series-of-images that shows the traffic-light 20 as swinging away-from and rightward relative to the camera 24.

Several non-limiting examples of how images of the traffic-light 20 can be subjected to image-processing to help determine the motion-pattern 34 and the light-state 18 will now be discussed. One option is to determine an apparent-size 46 of the light-source 38 in the series-of-images by, for example, counting the number of camera-pixels that detect the light-source 38. It is recognized that counting the number of camera-pixels that detect the light-source 38 in each image of the series-of-images 26 will include tracking the position of where the light-source 38 appears in each of the images. Several algorithms for tracking a moving object in a series-of-images are known and could be used here. The preferred-image 36 is then selected based on which of the images shows or renders the apparent-size 46 characterized as largest in the series-of-images 26. That is, the preferred-image 36 is the image that has the greatest number of camera-pixels that detect the light-source 38. In this example it may not be necessary to determine the particular type of motion, e.g. forward-and-backward, side-to-side, diagonal, oscillatory-rotating, bouncing. The effect of variation of the apparent-size 46 due to swinging if the traffic-light 20 is evident by examining FIGS. 3A and 3B.

Another option is for the controller 32 to be configured to determine an apparent-intensity 48 of the light-source 38 in the series-of-images 26. When the traffic-light 20 is characterized as being most directed at the camera 24, it is expected that the apparent-intensity 48 of the light-source will be the greatest. The preferred-image is then selected for having the apparent-intensity 48 characterized as greatest in images of the series-of-images 26. Here again, it may not be necessary to determine the particular type of motion, e.g. forward-and-backward, side-to-side, diagonal, oscillatory-rotating, bouncing.

Another option is for the controller 32 to be configured to define a bounding-box 50 about each image of the traffic-light 20 in the series-of-images 26, and determine if the traffic-light 20 is moving and/or the motion-pattern 34 based on changes in a box-size of the bounding-box 50 over the series-of-images. As used herein, the box-size may consist of, or include, a box-height, a box-width, a box-area, or any combination thereof. For example, if the motion is forward-and-backward relative to the camera 24, the box-height would vary, but the box-width may be substantially unchanged. If the motion-pattern 34 is determine to be forward-and-backward, the selection of the preferred-image 36 may be relatively critical to making a reliable determination of the light-state 18 because of the substantial variation in the apparent-intensity 48. In contrast, side-to-side motion may cause greater variation in box-width and box-area when compared to variation in box-height. However, since the apparent-intensity 48 may not change substantially, the selection which image or images are the preferred-image 36 may not be critical to making a reliable determination of the light-state 18.

It is contemplated that the controller 32 may be advantageously further configured to determine when the motion-pattern 34 is such that an other-light 52 (FIG. 3B) may be periodically revealed to the camera 24. As shown in FIG. 3, the swinging of the traffic-light 20 causes the red-light that is not directed to the host-vehicle 12 to be revealed to the camera 24. Alternatively, the other-light 52 could be a street-light (not shown) or advertisement-light (not shown) that is hidden behind the traffic-signal in FIG. 3A. Knowledge that the motion-pattern 34 is such that the other-light 52 may be periodically revealed to the camera 24 may help to prevent confusion about the light-state 18. For example, if the system 10 detects both the light-source 38 as a relatively constant intensity green-light and the other-light 52 as a flashing red-light, the vehicle-operation block 54 (FIG. 1) may erroneously elect to apply the brakes rather than continue through the intersection 22.

It is also contemplated that the controller 32 may be advantageously further configured to determine a motion-period 56 of the motion-pattern 34, where the motion-period 56 may correspond to the period of oscillation of the swinging-motion of the traffic-light 20. Given the motion-period 56, the controller 32 can predict which of future-images 58 rendered by the camera 24 will be selected as the preferred-image 36. That is, rather than wait until a large number of images in the series-of-images 26 have been rendered and analyzed to select the preferred-image 36, the motion-period 56 can be used to predict when the next instance of an image likely to be an instance of the preferred-image 36 will occur. This will allow the system 10 to more quickly and confidently determine that the light-state 18 has recently changed.

The system 10 may also include, or have access to via wireless communications, a digital-map 60 that indicates traffic-light-positions of various instances of the traffic-light 20 that the host-vehicle 12 may encounter.

Accordingly, a traffic-light-detection system (the system 10), a controller 32 for the system 10, and a method of operating the system 10 is provided. The system 10 provides for more reliable and quicker determination of the light-state 18 of a traffic-light 20 when the traffic-light 20 is swinging or otherwise moving relative to a host-vehicle 12 equipped with the system 10.

While this invention has been described in terms of the preferred embodiments thereof, it is not intended to be so limited, but rather only to the extent set forth in the claims that follow.

We claim:

1. A traffic-light-detection system that visually determines a light-state of a traffic-light proximate to an automated vehicle, said system comprising:
   a camera on a host-vehicle, said camera renders a series-of-images of a traffic-light proximate to a host-vehicle; and
   a controller in communication with the camera, wherein the controller is configured to determine a motion-pattern of the traffic-light based on the series-of-images, select a preferred-image from the series-of-images, wherein the preferred-image shows a light-source of the traffic-light characterized as being most directed at the camera when the motion-pattern indicates that the traffic-light is moving, determine a light-state of the traffic-light based on the preferred-image.

2. The system in accordance with claim 1, wherein the controller is further configured to determine an apparent-size of the light-source in the series-of-images, and the preferred-image is selected for having the apparent-size characterized as largest in the series-of-images.

3. The system in accordance with claim 1, wherein the controller is further configured to determine an apparent-intensity of the light-source in the series-of-images, and the preferred-image is selected for having the apparent-intensity characterized as greatest in the series-of-images.

4. The system in accordance with claim 1, wherein the controller is further configured to define a bounding-box about each image of the traffic-light in the series-of-images, and determine the motion-pattern based on changes in a box-size of the bounding-box over the series-of-images.

5. The system in accordance with claim 1, wherein the controller is further configured to determine when the motion-pattern is such that an other-light is periodically revealed to the camera.

6. The system in accordance with claim 1, wherein the controller is further configured to determine a motion-period of the motion-pattern, and predict which of future-images rendered by the camera will be selected as the preferred-image.

7. The system in accordance with claim 1, wherein the system includes a radar in communication with the controller, and the controller is further configured to further determine the motion-pattern based on return-signals detected by the radar.

8. A traffic-light-detection system that visually determines a light-state of a traffic-light proximate to an automated vehicle, said system comprising:
- a camera on a host-vehicle, said camera renders a series-of-images of a traffic-light proximate to a host-vehicle;
- a radar on the host-vehicle, said radar detects radar-returns from the traffic-light; and
- a controller in communication with the camera and the radar, wherein the controller is configured to determine a motion-pattern of the traffic-light based on the radar-returns, select a preferred-image from the series-of-images based on the motion-pattern, wherein the preferred-image shows a light-source of the traffic-light characterized as being most directed at the camera when the motion-pattern indicates that the traffic-light is moving, determine a light-state of the traffic-light based on the preferred-image.

9. The system in accordance with claim 8, wherein the controller is further configured to determine an apparent-size of the light-source in the series-of-images, and the preferred-image is selected for having the apparent-size characterized as largest in the series-of-images.

10. The system in accordance with claim 8, wherein the controller is further configured to determine an apparent-intensity of the light-source in the series-of-images, and the preferred-image is selected for having the apparent-intensity characterized as greatest in the series-of-images.

11. The system in accordance with claim 8, wherein the controller is further configured to define a bounding-box about each image of the traffic-light in the series-of-images, and further determine the motion-pattern based on changes in a box-size of the bounding-box over the series-of-images.

12. The system in accordance with claim 8, wherein the controller is further configured to determine when the motion-pattern is such that an other-light is periodically revealed to the camera.

13. The system in accordance with claim 8, wherein the controller is further configured to determine a motion-period of the motion-pattern, and predict which of future-images rendered by the camera will be selected as the preferred-image.

\* \* \* \* \*